United States Patent [19]

Lu

[11] Patent Number: 5,873,620
[45] Date of Patent: Feb. 23, 1999

[54] LIGHT FILTERING PLATE FASTENED TO SUN VISOR OF MOTOR VEHICLE

[76] Inventor: Jesse Lu, 52 Tah Yong Street, Fong Yuan City, Taichung Hsien, Taiwan

[21] Appl. No.: 966,324

[22] Filed: Nov. 7, 1997

[30] Foreign Application Priority Data

Apr. 21, 1997 [CN] China .................................. 86206198

[51] Int. Cl.⁶ ........................................................ B60J 3/02
[52] U.S. Cl. .......................................... 296/97.5; 296/97.6
[58] Field of Search ..................................... 296/97.5, 97.6

[56] References Cited

U.S. PATENT DOCUMENTS

3,016,262  1/1962  Hunt ....................................... 296/97.5
4,919,469  4/1990  Aizawa et al. .......................... 296/97.6
5,379,929  1/1995  Eskandry ................................ 296/97.6

*Primary Examiner*—Gary C. Hoge
*Attorney, Agent, or Firm*—Harrison & Egbert

[57] ABSTRACT

A light filtering plate is fastened with a sun visor of the motor vehicle for enhancing the shading effect of the sun visor. The light filtering plate is transparent and provided respectively at both longitudinal ends thereof with an arcuate edge. The light filtering plate is fastened with a fastening seat which is composed of a support rod and an adhesive tape enabling the fastening seat to be attached securely to the sun visor or an accessory of the motor vehicle.

3 Claims, 10 Drawing Sheets

LIGHT FILTERING PLATE FASTENED TO SUN VISOR OF MOTOR VEHICLE

FIELD OF THE INVENTION

The present invention relates generally to a sun visor of the motor vehicle, and more particularly to a light filtering plate to be fastened with the sun visor of a motor vehicle for enhancing the shading effect of the sun visor.

BACKGROUND OF THE INVENTION

The conventional sun visor of the motor vehicle is generally made of an opaque material and is therefore prone to hinder the field of vision of an operator of the motor vehicle. In addition, the conventional sun visor is incapable of protecting and shading effectively the eyes of the operator of the motor vehicle from the light of the headlights of a motor vehicle approaching in the opposite direction.

SUMMARY OF THE INVENTION

The primary objective of the present invention is therefore to provide a sun visor with a light filtering plate capable of enhancing effectively the shading effect of the sun visor.

In keeping with the principle of the present invention, the foregoing objective of the present invention is attained by a light filtering plate having a transparent plate capable of filtering and shading light. The plate is movably fastened with a fastening seat engageable with a sun visor of the automotive vehicle.

The foregoing objective, features, functions, and advantages of the present invention will be more readily understood upon a thoughtful deliberation of the following detailed description of an embodiment of the present invention with reference to the accompanying drawings.

DETAILED DESCRIPTION OF THE INVENTION

Figure 1:
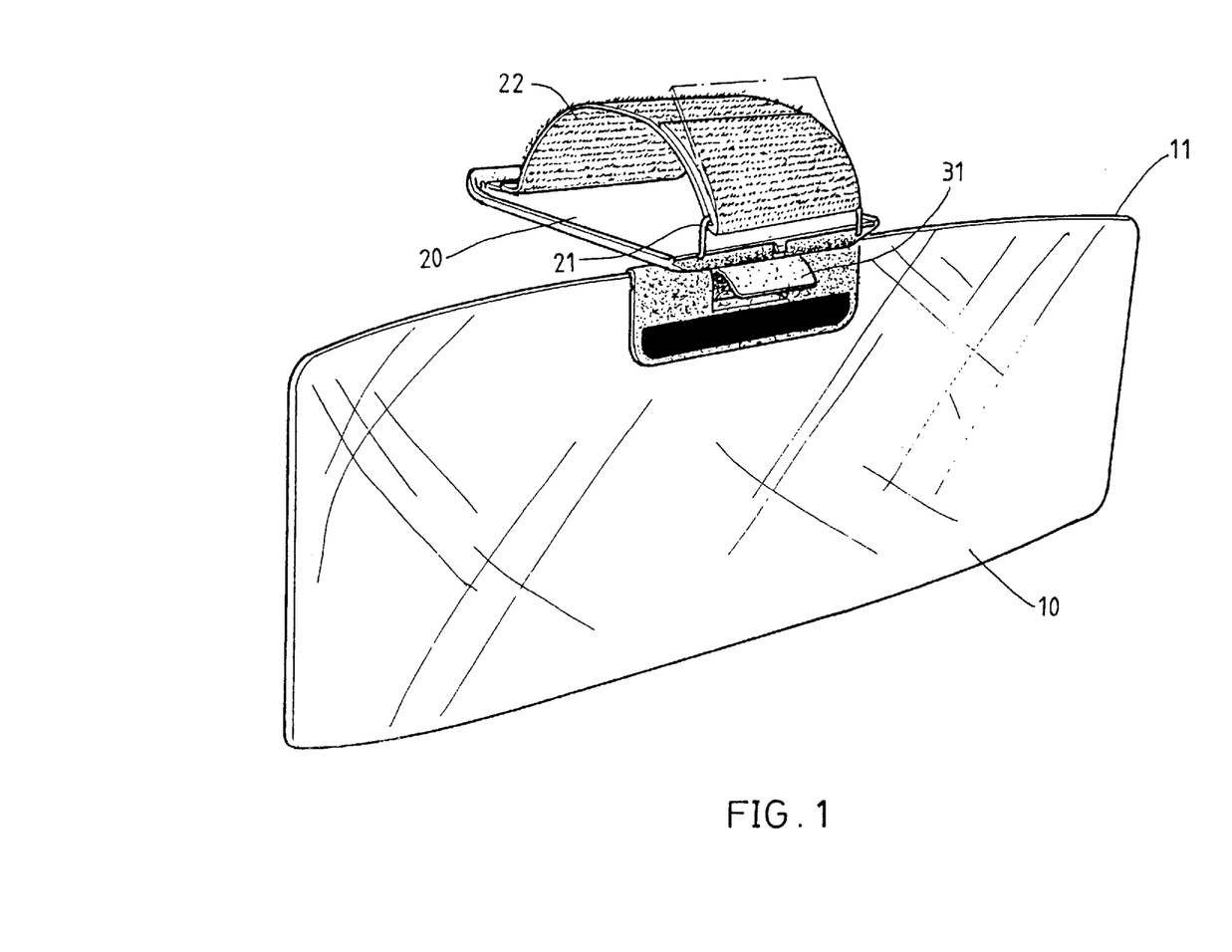
FIG. 1 shows a perspective view of the present invention.
Figure 2:
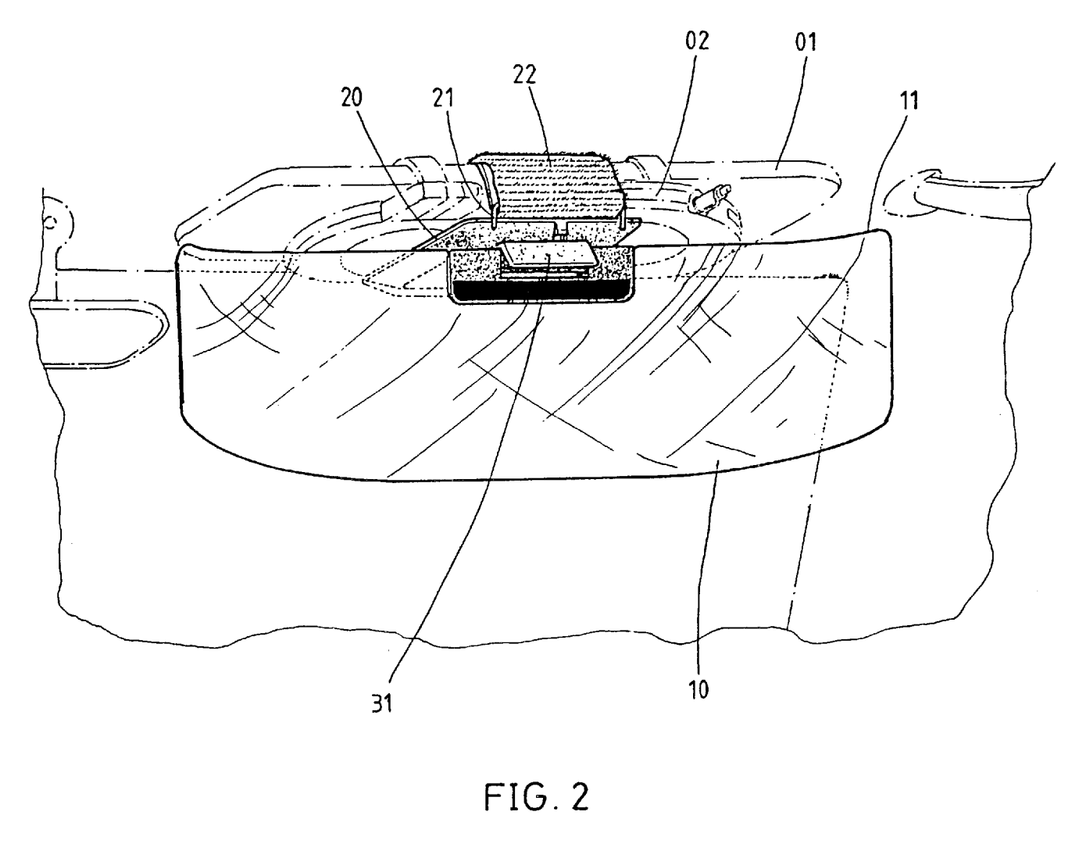
FIG. 2 shows a schematic view of the present invention in use.
Figure 3:
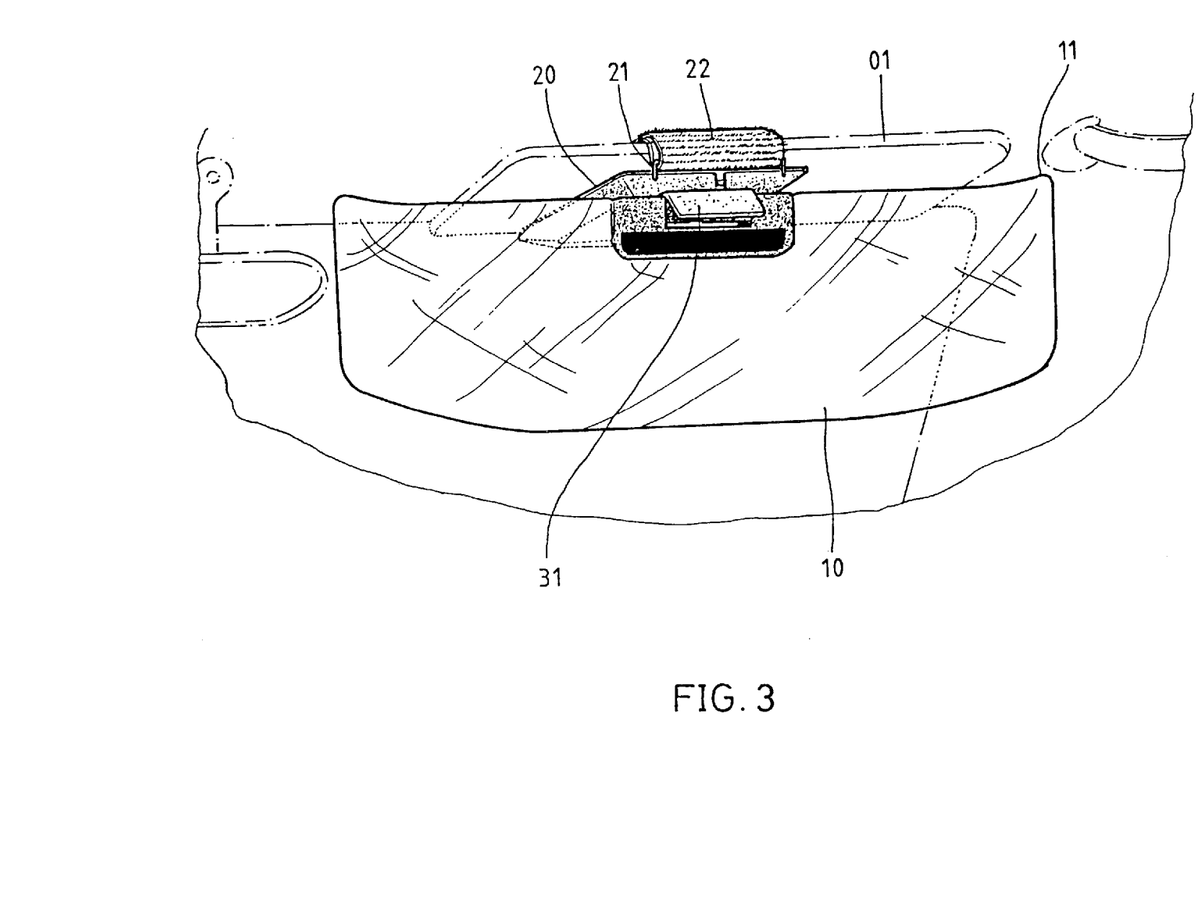
FIG. 3 shows another schematic view of the present invention in use.

As shown in FIGS. 1–3, a light filtering plate 10 of the present invention is intended to be fastened with a sun visor of the automotive vehicle or an accessory of the automotive vehicle. The light filtering plate 10 is made of a transparent material and is capable of filtering and shading light. The light filtering plate 10 is provided respectively at both longitudinal ends thereof with an arcuate edge 11. The light filtering plate 10 is engaged with a fastening seat 20 which is composed of a support rod 21 and an adhesive tape 22. The adhesive tape 22 is retained by the support rod 21.

Figure 4:
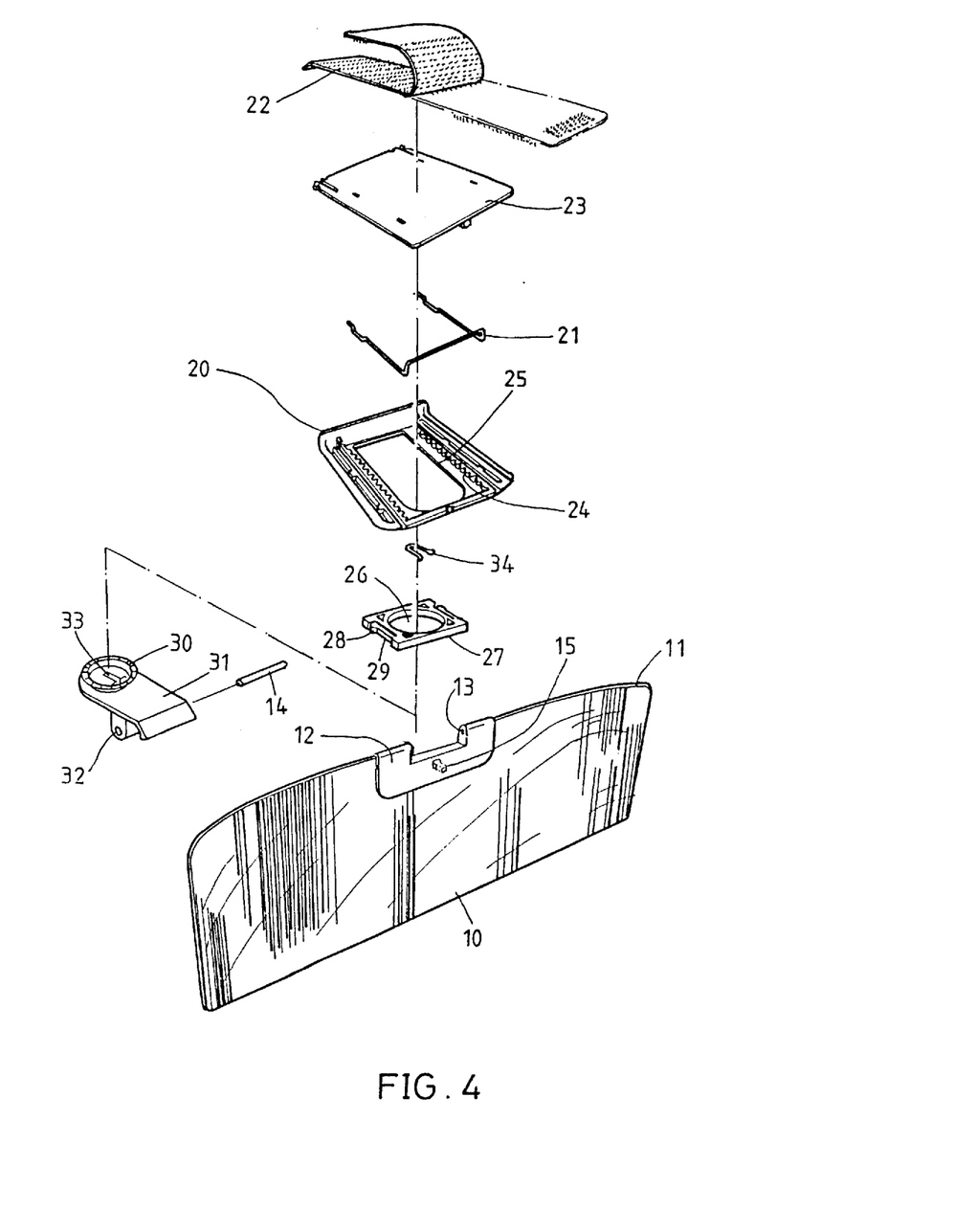
FIG. 4 shows an exploded view of the present invention.
Figure 5:
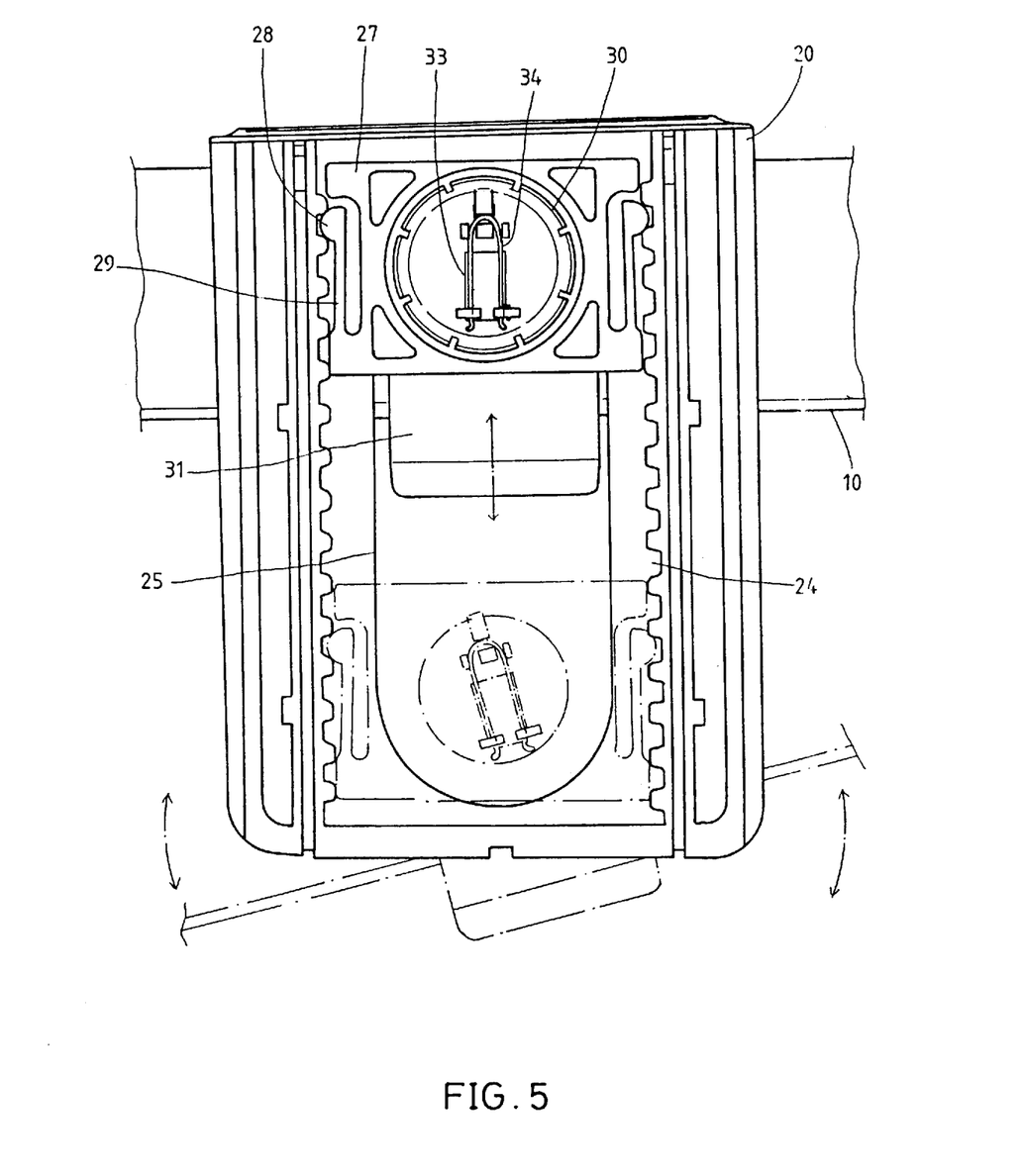
FIG. 5 shows a sectional view of the present invention in combination.
Figure 6:
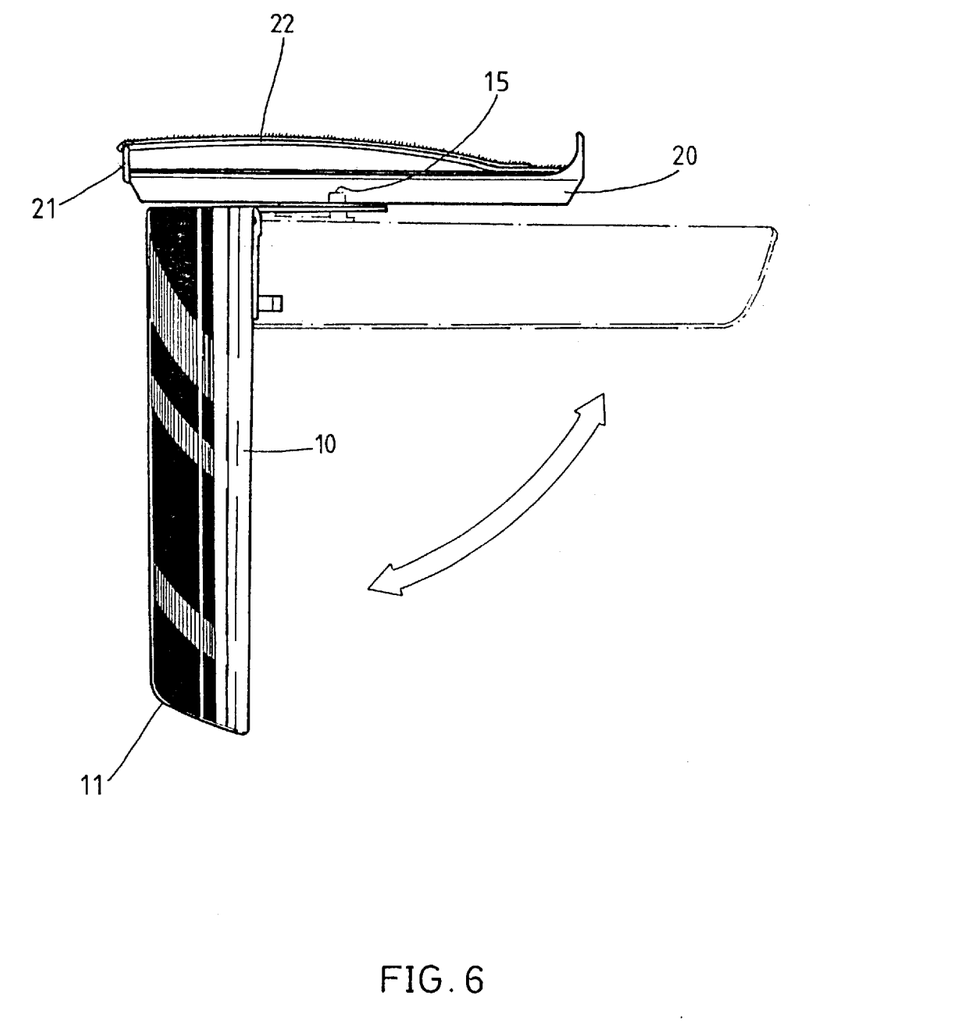
FIG. 6 shows a side schematic view of the present invention in use.

As shown in FIG. 4, the fastening seat 20 is further provided with a slide plate 23, two toothed portions 24, a slide slot 25, a slide seat 27 having a pivoting hole 26 and an elastic arm 29 provided with an arresting portion 28. The pivoting hole 26 is engaged with a pivoting member 31 having a hooked piece 30 and a pivot seat 32. The light filtering plate 10 has a fastening portion 12 provided with a pivoting lug 13 which is engaged with the pivot seat 32 by means of a pivot 14. The fastening portion 12 is provided with a clamping column 15 corresponding in location to an opening 33 of the pivoting member 31. A clamping rod member 34 is located over the opening 33.

The filtering plate 10 is fastened with the lower side of the fastening seat 20 in conjunction with the adhesive tape 22 engaging a built-in sun visor 10 or an article storage case 20. Under normal circumstances, the clamping column 15 of the fastening portion 12 is located in the opening 33 of the pivoting member 31. When the light filtering plate 10 is folded in reverse such that the plate 10 is rotated downward on the pivot seat 32 acting as an axis, and that the clamping column 15 is disengaged with the clamping rod member 34. The plate 10 can be swiveled by the hooked piece 30 in conjunction with the pivoting hole 26 of the slide seat 27. The slide seat 27 may be moved between the toothed portions 24 of the fastening seat 20 in conjunction with the arresting portion 28 of the elastic arm 29.

Figure 7:
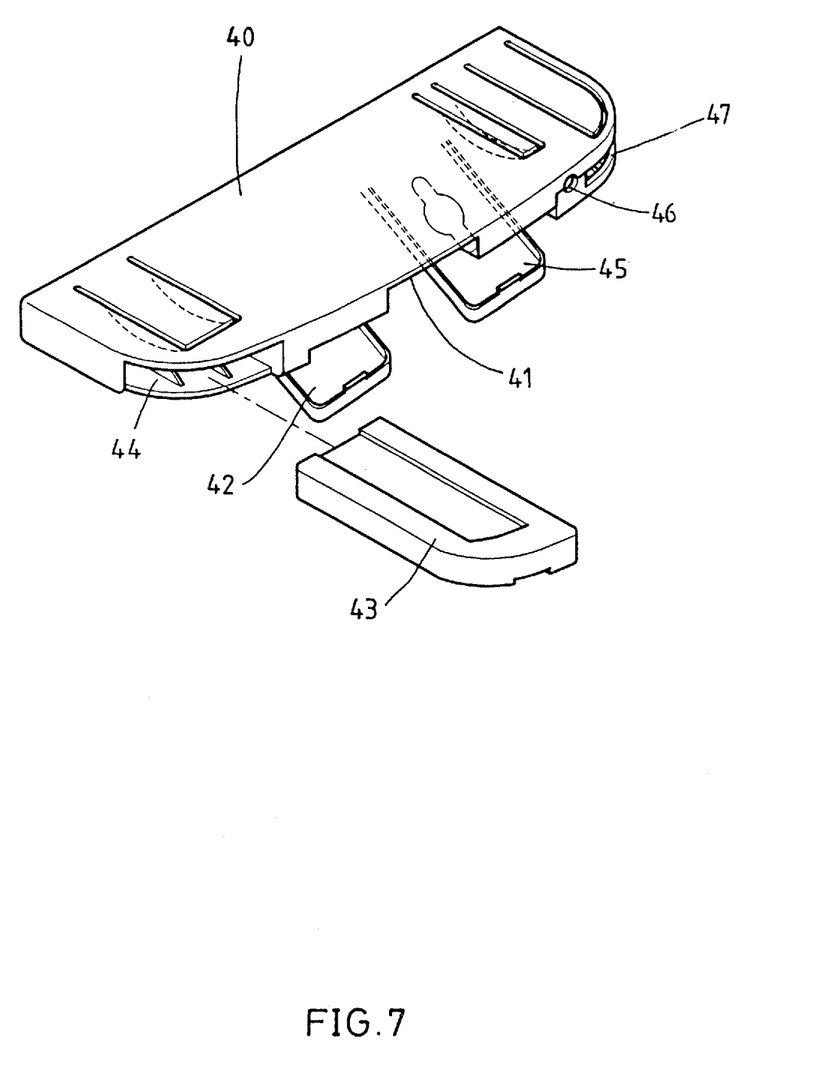
FIG. 7 shows a perspective view of an article storage case capable of cooperating with the present invention.
Figure 8:
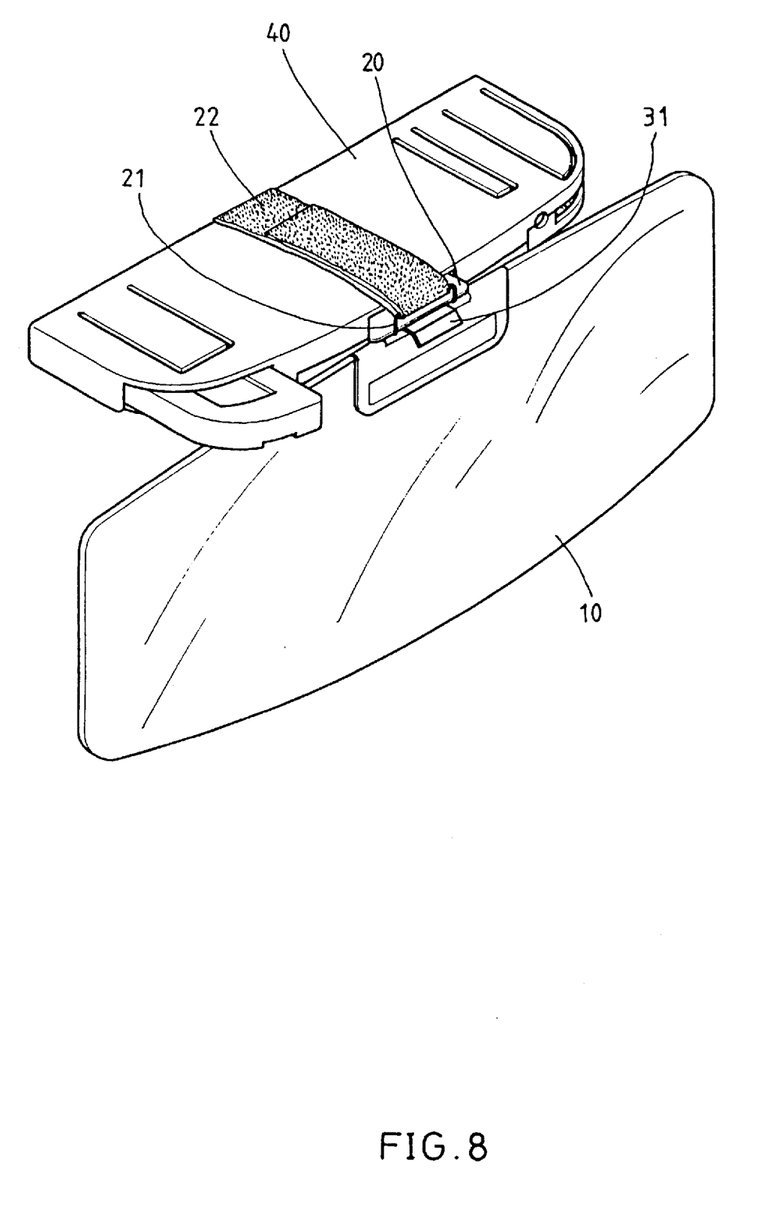
FIG. 8 shows a schematic view of the present invention in conjunction with the article storage case as shown in FIG. 7.
Figure 9:
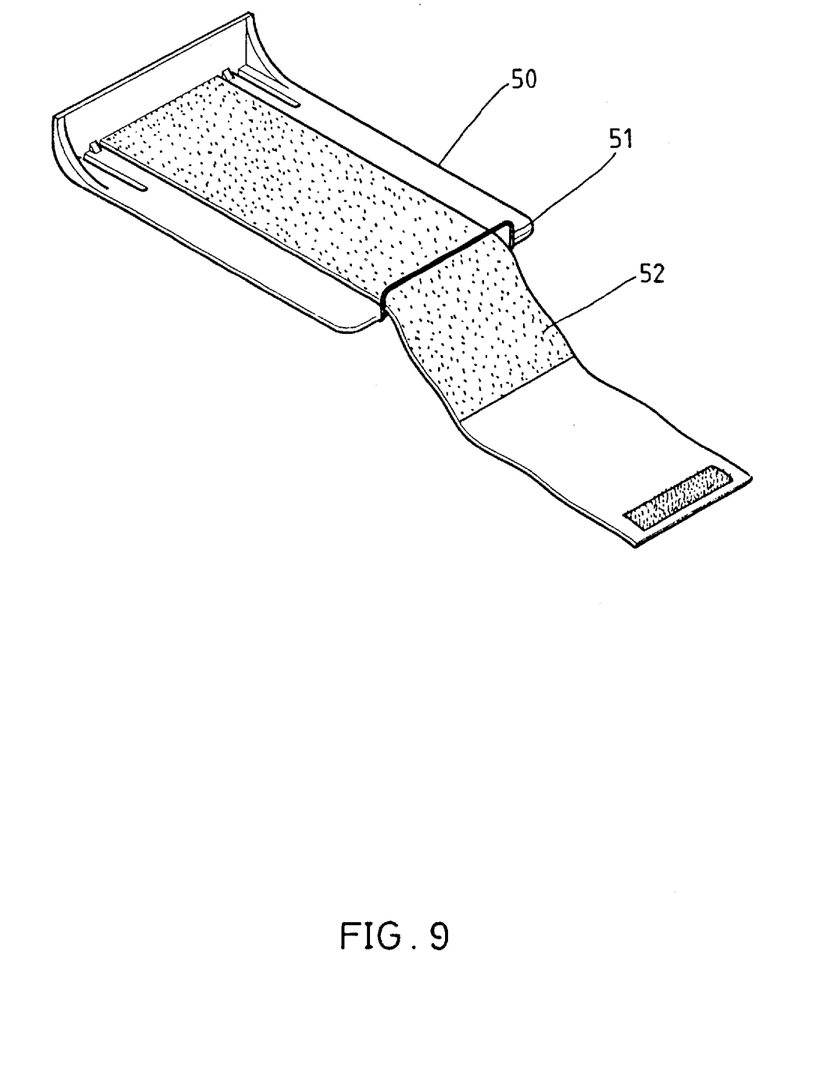
FIG. 9 shows a perspective view of the fastening seat of the present invention.
Figure 10:
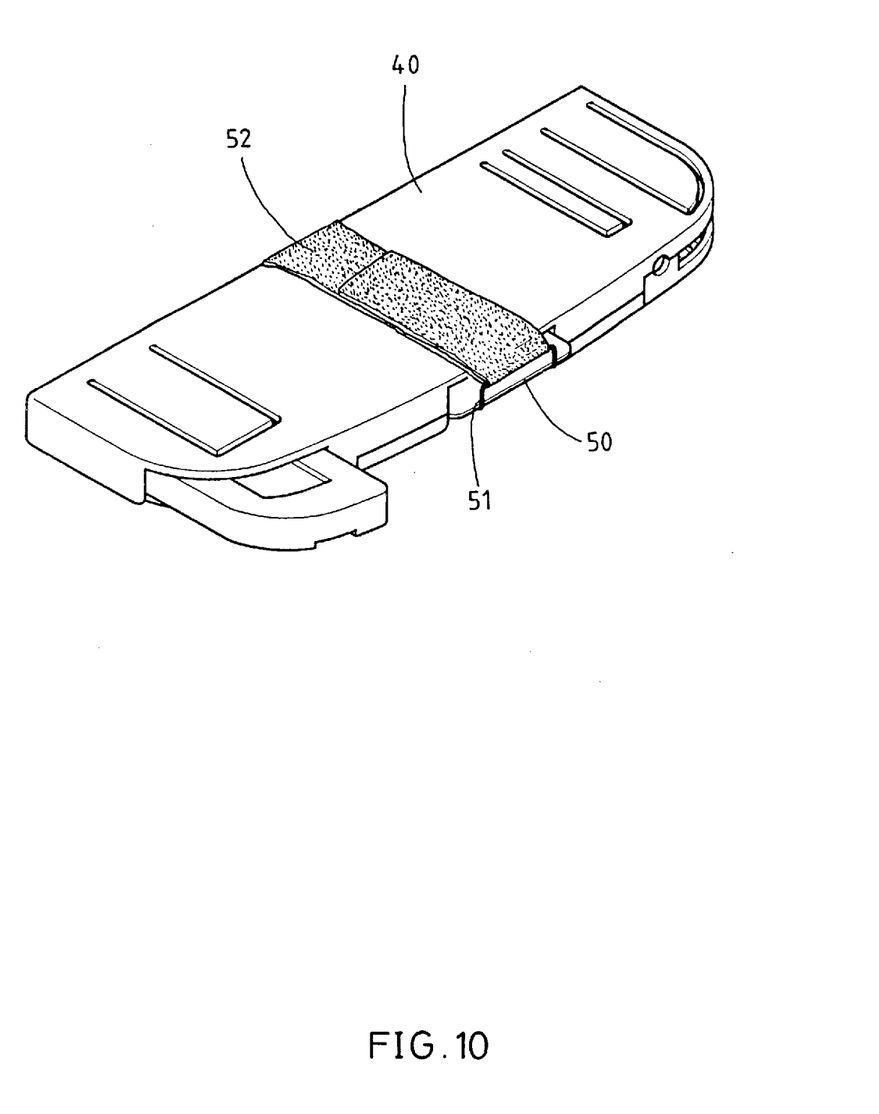
FIG. 10 shows a schematic view of the fastening seat in conjunction with the article storage case of the present invention.

As shown in FIGS. 7 and 8, the fastening seat 20 is engaged with an article storage case 40 which is provided with a support slot 41 corresponding in location to and engageable with the fastening seat 20 and is further provided with a slide support 44 for engaging a lift-type storage case 42, an emergency aid case 43, a tissue paper storage case 45, a pen locating seat 46, and a toll ticket holding seat 47. The article storage case 40 is engageable with a fastening seat element 50 having an adhesive tape 51 and an expandable support rod 52, as shown in FIGS. 9 and 10.

What is claimed is:

1. An apparatus for filtering light from a sun visor or accessory of a motor vehicle comprising:

a light filtering plate fastened to the sun visor or accessory of the motor vehicle by means of a fastening seat, wherein said light filtering plate is transparent and capable of filtering and shading light, said light filtering plate being provided at longitudinal ends thereof with an arcuate edge, and wherein said fastening seat is provided with a movable support rod and an adhesive tape, said fastening seat being engaged with an article storage case, said article storage case comprising a support slot corresponding in location to and engageable with said fastening seat, said article storage case further comprising a lift-type storage case, a tissue, storage case, a pen locating seat, and a ticket-holding seat.

2. The light filtering plate as defined in claim 1, wherein said fastening seat is provided with a slide plate, two toothed portions, an opening located between said two toothed portions, a slide seat having a pivoting hole, an elastic arm provided with an arresting portion, a pivoting member having a hooked piece and a pivot seat; and wherein said fastening portion of said light filtering plate is provided with pivoting lugs engageable with said pivot seat by means of a pivot and is further provided with a claming column corresponding in location to said pivoting member.

3. The apparatus as defined in claim 1, wherein said article storage case is provided with a fastening seat element having an adhesive tape and an expandable support rod.

* * * * *